(12) United States Patent
Kang et al.

(10) Patent No.: US 7,834,516 B2
(45) Date of Patent: Nov. 16, 2010

(54) PIEZOELECTRIC ULTRASONIC MOTOR

(75) Inventors: Byung Woo Kang, Seoul (KR);
Burhanettin Koc, Kyungki-do (KR);
Jung Ho Ryu, Kyungki-do (KR); Sang Min On, Seoul (KR); Dong Kyun Lee, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/588,696

(22) Filed: Oct. 23, 2009

(65) Prior Publication Data

US 2010/0045140 A1   Feb. 25, 2010

Related U.S. Application Data

(62) Division of application No. 11/498,044, filed on Aug. 3, 2006, now Pat. No. 7,638,926.

(30) Foreign Application Priority Data

Aug. 5, 2005   (KR) .............. 10-2005-0071758

(51) Int. Cl.
*H01L 41/04* (2006.01)
*H02N 2/12* (2006.01)
(52) U.S. Cl. .............. 310/323.01; 310/323.04; 310/323.09; 310/323.14
(58) Field of Classification Search .............. 310/323.01–323.21, 328, 348, 369
See application file for complete search history.

(56) References Cited

U.S. PATENT DOCUMENTS

| | | | |
|---|---|---|---|
| 6,339,278 B1 | 1/2002 | Shinohara et al. | |
| 7,119,477 B1 | 10/2006 | Ganor et al. | |
| 7,382,080 B2 | 6/2008 | Lee et al. | |
| 2005/0052098 A1 | 3/2005 | Henderson | |

(Continued)

FOREIGN PATENT DOCUMENTS

JP   02-084078   3/1990

(Continued)

OTHER PUBLICATIONS

U.S. Appl. No. 11/498,044, filed Aug. 3, 2006, Byung Woo Kang, et al., Samsung Electro-Mechanics Co., Ltd.

(Continued)

*Primary Examiner*—Walter Benson
*Assistant Examiner*—Derek J Rosenau

(57) ABSTRACT

A piezoelectric ultrasonic motor includes a piezoelectric stator including a hollow metal tube having a quadrangular cross section and four piezoelectric elements each installed in each outer face of the metal tube; a rotary shaft including a rotation bar inserted into an inner space of the metal tube, an upper rotation member provided around the rotation bar in contact with an upper surface of the piezoelectric stator, the rotation member rotating in response to the strain of the piezoelectric stator, a lower rotation member adapted to restrain the rotation of the rotation bar and contacting a lower surface of the piezoelectric stator and a power transmission member provided at one portion of the rotation bar to transmit the rotation of the rotation member to an object to be transported; and a power supply to apply a supply voltage necessary for the actuation of the piezoelectric stator.

11 Claims, 11 Drawing Sheets

U.S. PATENT DOCUMENTS

2006/0049720 A1 3/2006 Henderson

FOREIGN PATENT DOCUMENTS

| | | |
|---|---|---|
| JP | 02-311184 | 12/1990 |
| JP | 5-22963 | 1/1993 |
| JP | 07-231684 | 8/1995 |
| JP | 2002-199754 | 7/2002 |

OTHER PUBLICATIONS

Korean Patent Office Action, mailed Sep. 29, 2006, and issued in corresponding Korean Patent Application No. 10-2005-0071758.

Office Action issued in parent U.S. Appl. No. 11/498,044 mailed May 13, 2008.

Office Action issued in parent U.S. Appl. No. 11/498,044 mailed Aug. 21, 2008.

Japanese Office Action issued on Oct. 7, 2008 in corresponding Japanese Patent Application No. 2006-213768.

Office Action issued in parent U.S. Appl. No. 11/498,044 mailed Jan. 13, 2009.

Office Action issued in parent U.S. Appl. No. 11/498,044 mailed Apr. 1, 2009.

Notice of Allowance and Fee Issued in parent U.S. Appl. No. 11/498,044 mailed Aug. 21, 2009.

Office Communication issued in parent U.S. Appl. No. 11/498,044 mailed Oct. 8, 2009.

PIEZOELECTRIC ULTRASONIC MOTOR

CROSS-REFERENCE TO RELATED APPLICATIONS

This application is a divisional and claims priority to U.S. application Ser. No. 11/498,044, filed Aug. 3, 2006 now U.S. Pat. No. 7,638,926, which in turn claims the benefit of Korean Patent Application No. 2005-0071758 filed on Aug. 5, 2005, in the Korean Intellectual Property Office, the disclosures of which are incorporated herein by reference.

BACKGROUND

1. Field

The present invention relates to a piezoelectric ultrasonic motor, and more particularly, to a metal tube type piezoelectric ultrasonic motor having a piezoelectric element arranged on the exterior of a metal tube.

2. Description of the Related Art

In general, a piezoelectric ultrasonic motor includes a piezoelectric stator having a piezoelectric element attached thereto and a rotary shaft contacting the piezoelectric stator to convert oscillation energy of the piezoelectric stator into rotation energy through friction against the piezoelectric stator. The piezoelectric motor is classified into several types.

As an example, U.S. Patent Application Publication No. 2005/0052098 discloses a metal tube type piezoelectric ultrasonic motor.

As shown in FIGS. 1A and 1B, the metal type piezoelectric ultrasonic motor disclosed in this document includes a hollow metal tube or housing 14, four (4) piezoelectric elements 18, 20, 22 and 24 mounted on the exterior of the housing 14, a shaft 12 received inside the housing 14 and having threads 17 formed on the outer periphery thereof, a nut 16 with the inner periphery meshed with the threads 17 of the shaft 12 and the outer periphery inserted into an inner space of the housing 14, and a bushing 28 for supporting the rotation of the shaft 17.

In this piezoelectric ultrasonic motor 10, the piezoelectric elements 18, 20, 22 and 24 generate strain when an electric field is applied thereto, which is transferred through threads in the inner periphery of the nut 16 to the threads 17 of the shaft 12, thereby to rotate the shaft 17.

However, since the conventional metal tube type piezoelectric ultrasonic motor 10 produces rotational force through linear contact between the threads of the nut 16 and those of the shaft 12, rotation number and torque are low and thus sufficient power cannot be achieved.

Furthermore, the shaft 12 of the piezoelectric ultrasonic motor 10 is moved into or out of the metal tube in response to the rotation of the shaft 12, which needs to be supported between the nut 16 and the bushing 28. Then, the length of the shaft 12 should have an enough margin to be longer than the distance between the nut 16 and the bushing 28 (i.e., the length of the metal tube). This disadvantageously increases a mounting space for the piezoelectric ultrasonic motor.

Recently, owing to rapid development of IT industries, microscopic camera modules to be mounted on a mobile phone and the like are getting more important. To meet demands of users, microscopic camera modules having automatic focusing and/or optical zooming function are being distributed.

An electromotive motor or piezoelectric stator (or piezoelectric ultrasonic motor) can be used to drive or transport a lens in such a microscopic camera module. The piezoelectric ultrasonic motor using a piezoelectric element has been proposed as a lens driving actuator for the microscopic camera module due to its merits such as rapid response, prevented reverse driving and high resolution in transport.

Accordingly, a piezoelectric ultrasonic motor adequate for lens driving for such a microscopic camera module is demanded.

SUMMARY

The present invention has been made to solve the foregoing problems of the prior art and therefore an object of certain embodiments of the present invention is to provide a piezoelectric ultrasonic motor capable of increasing force and generating sufficient strain with stable actuation, and thus being applied to various apparatuses such as a camera module.

Another object of certain embodiments of the present invention is to provide a piezoelectric ultrasonic motor and a lens driving apparatus having the same capable of generating a sufficient level of strain and torque necessary for transporting an object.

Further another object of certain embodiments of the present invention is to provide a piezoelectric ultrasonic motor and a lens driving apparatus having the same which can be provided in a module while preventing pollution of other parts.

According to an aspect of the invention for realizing the object, there is provided a piezoelectric ultrasonic motor comprising: a piezoelectric stator including a metal tube with an inner space and a plurality of piezoelectric elements mounted on the outer circumference of the metal tube, the piezoelectric stator straining with an electric field applied thereto; a rotary shaft including a rotation bar inserted into the inner space of the metal tube, a rotation member provided around the rotation bar in contact with an upper or lower surface of the piezoelectric stator, the rotation member rotating in response to the strain of the piezoelectric stator, and a power transmission member provided at one portion of the rotation bar to transmit the rotation of the rotation member to an object to be transported; and a power supply for applying a supply voltage necessary for the actuation of the piezoelectric stator.

Preferably, the rotation member includes an upper rotation member contacting the upper surface of the piezoelectric stator and a lower rotation member contacting the lower surface of the piezoelectric stator.

Preferably, the rotary shaft further includes a friction member fixed to a surface of the rotation member contacting the piezoelectric stator, and wherein the rotary shaft rotates through face contact between the piezoelectric stator and the friction member.

Here, the friction member is preferably made of Poly-Ether-Ether-Ketone (PEEK).

Preferably, the friction material is made of alumina, and wherein the contact surface of the piezoelectric stator contacting the friction member is fixedly provided with a contact member made of alumina or an alumina coat.

Preferably, the rotary shaft further includes a preload member for pressing the rotation member toward the piezoelectric stator.

Preferably, the power supply applies the electric field to a nodal point of the piezoelectric stator.

The piezoelectric ultrasonic motor may further comprise a housing for receiving the piezoelectric stator and the rotary shaft.

The piezoelectric ultrasonic motor may further comprise a holder for supporting the piezoelectric stator at a nodal point, wherein the holder is seated in an opening of the housing.

Preferably, the metal tube comprises a hollow tube having a circular or polygonal cross section, and wherein seating portions are formed on the outer circumference of the metal tube to mount the piezoelectric elements.

More preferably, the metal tube has a quadrangular cross-section, and each of the piezoelectric elements is mounted on each outer face of the metal tube.

Preferably, the piezoelectric elements have polarization directed outward from the center of the piezoelectric stator.

Alternatively, the piezoelectric elements have polarization directed toward the center from outside of the piezoelectric stator.

More preferably, the power supply applies supply voltages to the piezoelectric elements with a phase difference of 90° in their order in a clockwise or counterclockwise direction.

Preferably, adjacent two of the piezoelectric elements have polarization directed from outside of the piezoelectric stator to the center, the other adjacent two of the piezoelectric elements have polarization directed outward from the center of the piezoelectric stator.

More preferably, the power supply applies supply voltages of the same phase to opposing piezoelectric elements but supply voltages of a phase difference of 90° to adjacent piezoelectric elements.

Preferably, a friction material of high friction coefficient may be coated on the contact surface of the rotation member contacting the piezoelectric stator.

Preferably, the power transmission member may be a lead screw or gear formed at one portion of the rotation bar.

Furthermore, it is preferable that the power transmission member may be a belt or chain provided at one portion of the rotation bar.

According to another aspect of the invention for realizing the object, there is provided a piezoelectric ultrasonic motor comprising: a piezoelectric stator including a hollow metal tube having a quadrangular cross section and four piezoelectric elements each installed in each outer face of the metal tube, the piezoelectric stator straining with an electric field applied thereto; a rotary shaft including a rotation bar inserted into an inner space of the metal tube, an upper rotation member provided around the rotation bar in contact with an upper surface of the piezoelectric stator, the rotation member rotating in response to the strain of the piezoelectric stator, a lower rotation member adapted to restrain the rotation of the rotation bar and contacting a lower surface of the piezoelectric stator and a power transmission member provided at one portion of the rotation bar to transmit the rotation of the rotation member to an object to be transported; and a power supply for applying a supply voltage necessary for the actuation of the piezoelectric stator.

Preferably, the rotary shaft further includes a friction member fixed to a surface of the upper rotation member contacting the piezoelectric stator, and wherein the rotary shaft rotates through face contact between the piezoelectric stator and the friction member.

Preferably, the friction member or the lower rotation member is made of Poly-Ether-Ether-Ketone (PEEK).

Preferably, the friction member or the lower rotation member is made of alumina, and wherein the contact surface of the piezoelectric stator contacting the friction member is fixedly provided with a contact member made of alumina or an alumina coat.

Preferably, the rotary shaft further includes a preload member for pressing the rotation member toward the piezoelectric stator.

Preferably, the preload member comprises a coil spring mounted on the outer circumference of the rotation bar or a step of the lower rotation member.

The piezoelectric ultrasonic motor may further comprise a separation-preventing member inserted into a recess formed at the other portion of the rotation bar.

The piezoelectric ultrasonic motor may further comprise a washer provided between the lower rotation member and the separation-preventing member to minimize interference noise.

Preferably, the piezoelectric ultrasonic motor may further comprise a separation-preventing holder for surrounding the outer circumference of the piezoelectric stator and a terminal of the power supply connected to a nodal point of the piezoelectric stator to prevent the terminals from being separated from the piezoelectric stator.

In the meantime, the piezoelectric ultrasonic motor may further comprise a housing for receiving the piezoelectric stator and the rotary shaft.

Furthermore, the piezoelectric ultrasonic motor may further comprise a holder for supporting the piezoelectric stator at a nodal point, wherein the holder is seated in an opening of the housing.

Preferably, the piezoelectric elements have polarization directed outward from the center of the piezoelectric stator.

Alternatively, the piezoelectric elements have polarization directed toward the center from outside of the piezoelectric stator.

More preferably, the power supply applies supply voltages to the piezoelectric elements with a phase difference of 90° in their order in a clockwise or counterclockwise direction.

Preferably, adjacent two of the piezoelectric elements have polarization directed from outside of the piezoelectric stator to the center, the other adjacent two of the piezoelectric elements have polarization directed outward from the center of the piezoelectric stator.

More preferably, the power supply applies supply voltages of the same phase to opposing piezoelectric elements but supply voltages of a phase difference of 90° to adjacent piezoelectric elements.

Preferably, a friction material of high friction coefficient may be coated on the contact surface of the rotation member contacting the piezoelectric stator.

Preferably, the power supply applies the electric field to a nodal point of the piezoelectric stator.

Preferably, the power transmission member may be a lead screw or gear formed at one portion of the rotation bar.

Furthermore, it is preferable that the power transmission member may be a belt or chain provided at one portion of the rotation bar.

According to further another aspect of the invention for realizing the object, there is provided a lens driving apparatus comprising: a piezoelectric ultrasonic motor as described above and a lens unit having at least one lens, the lens unit being transported forward and backward via the power transmission member of the piezoelectric ultrasonic motor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

The present invention will now be described more fully hereinafter with reference to the accompanying drawings, in which preferred embodiments of the invention are shown.

Figure 2:
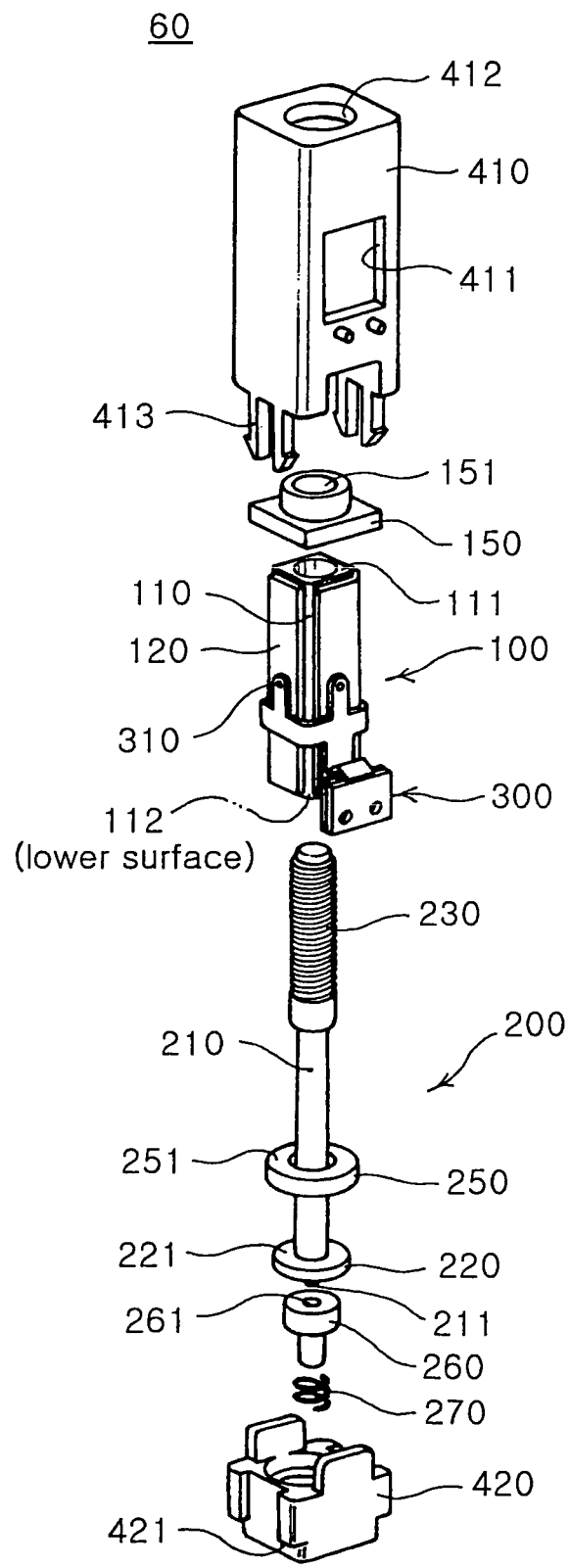
FIG. 2 is an exploded perspective view illustrating a piezoelectric ultrasonic motor according to a first embodiment of the invention.
Figure 3:
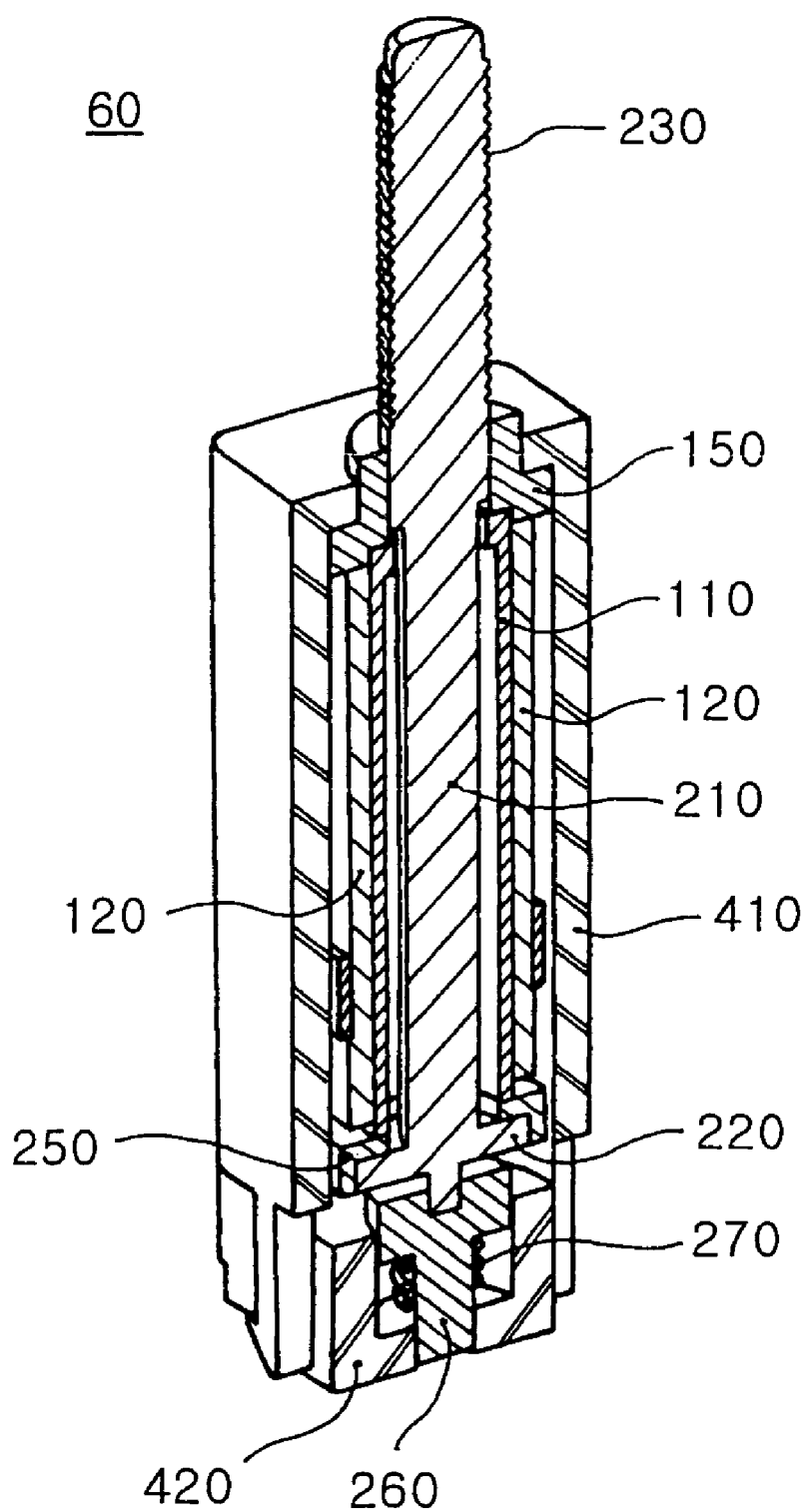
FIG. 3 is a cutaway perspective view illustrating the cross section of the piezoelectric ultrasonic motor according to the first embodiment of the invention.

FIG. 2 is an exploded perspective view illustrating a piezoelectric ultrasonic motor according to a first embodiment of the invention, and FIG. 3 is a cutaway perspective view illustrating the cross section of the piezoelectric ultrasonic motor according to the first embodiment of the invention.

Figure 4:
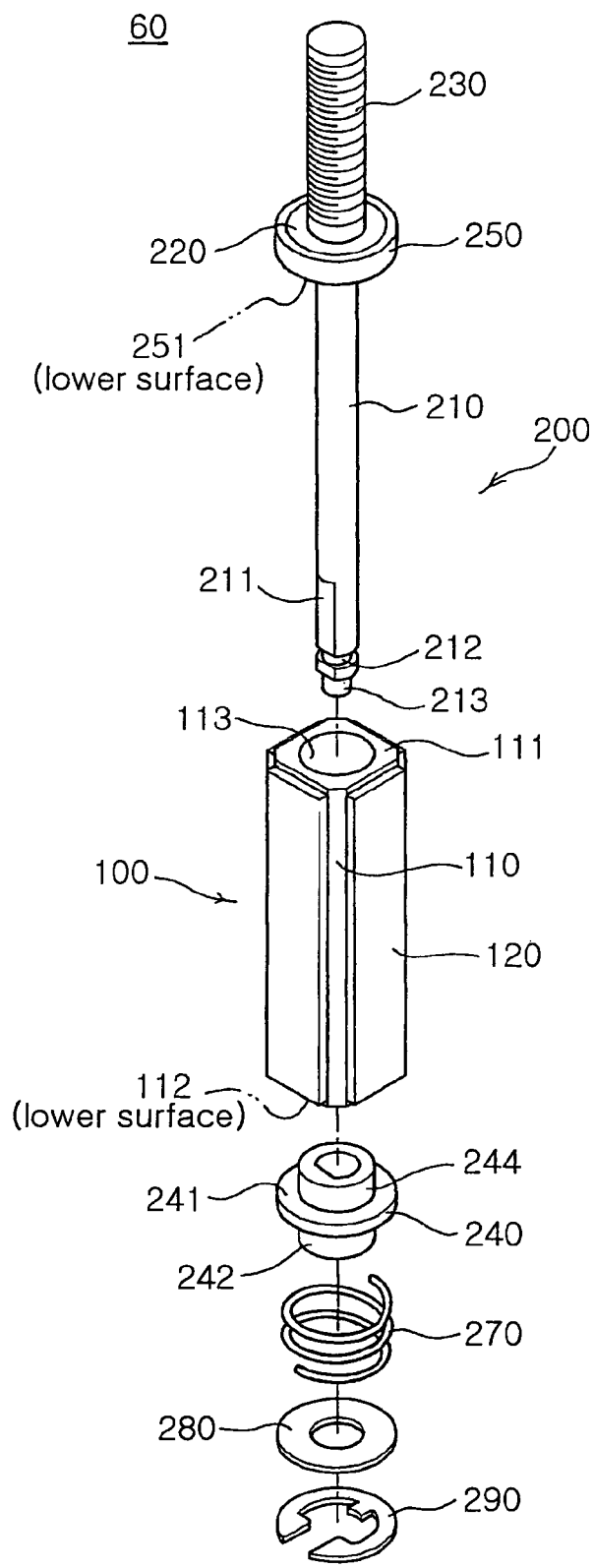
FIG. 4 is an exploded perspective view illustrating a piezoelectric ultrasonic motor according to a second embodiment of the invention.
Figure 5:
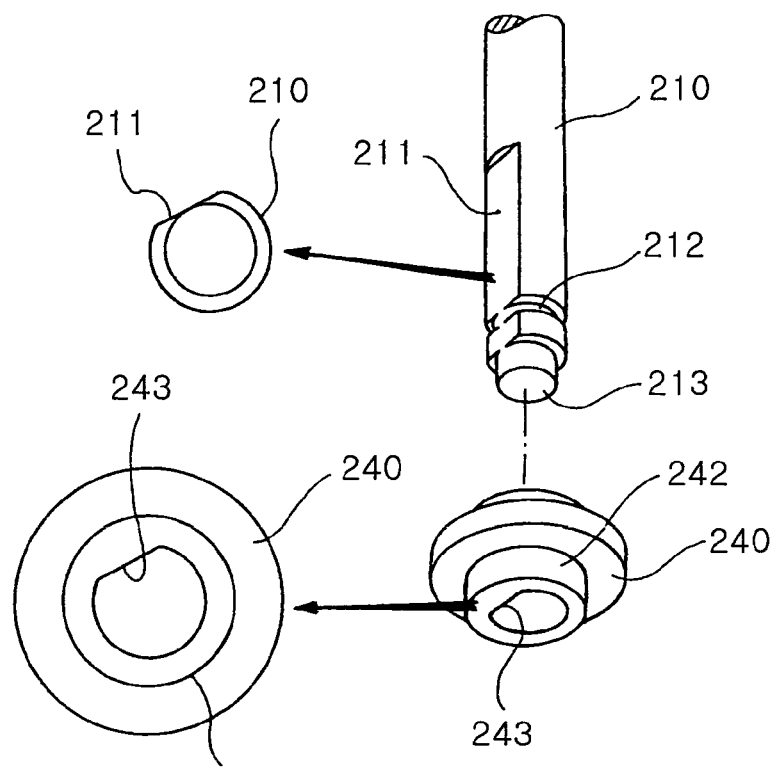
FIG. 5 is a perspective view illustrating important parts of the piezoelectric ultrasonic motor according to the second embodiment of the invention.
Figure 6:
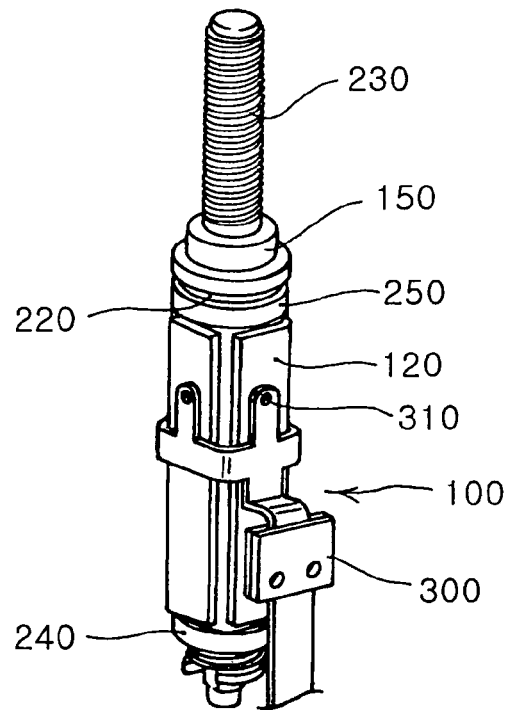
FIG. 6 is a perspective view illustrating the piezoelectric ultrasonic motor according to the second embodiment of the invention.
Figure 7:
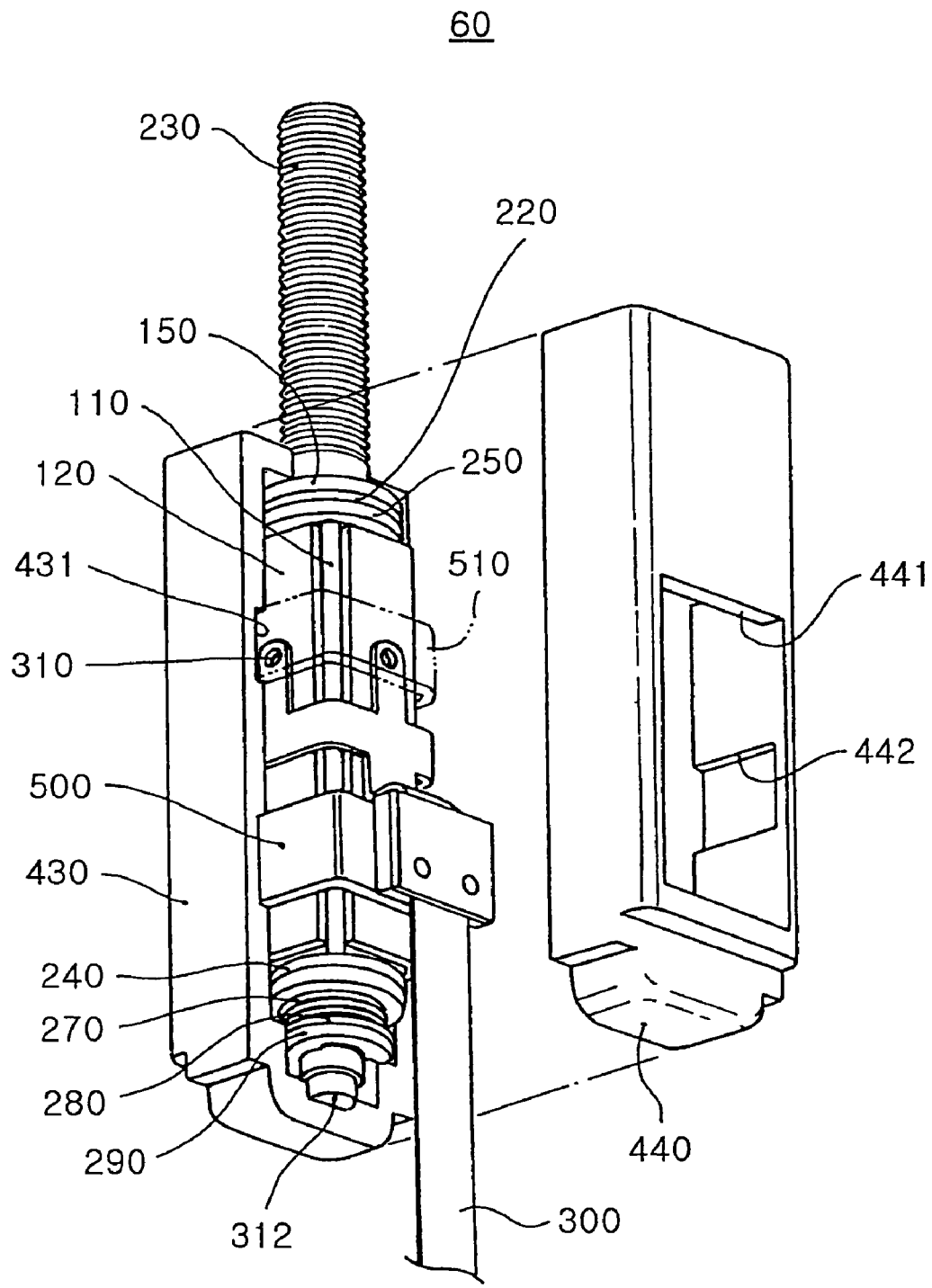
FIG. 7 is an assembly view illustrating the piezoelectric ultrasonic motor according to the second embodiment of the invention.
Figure 8:
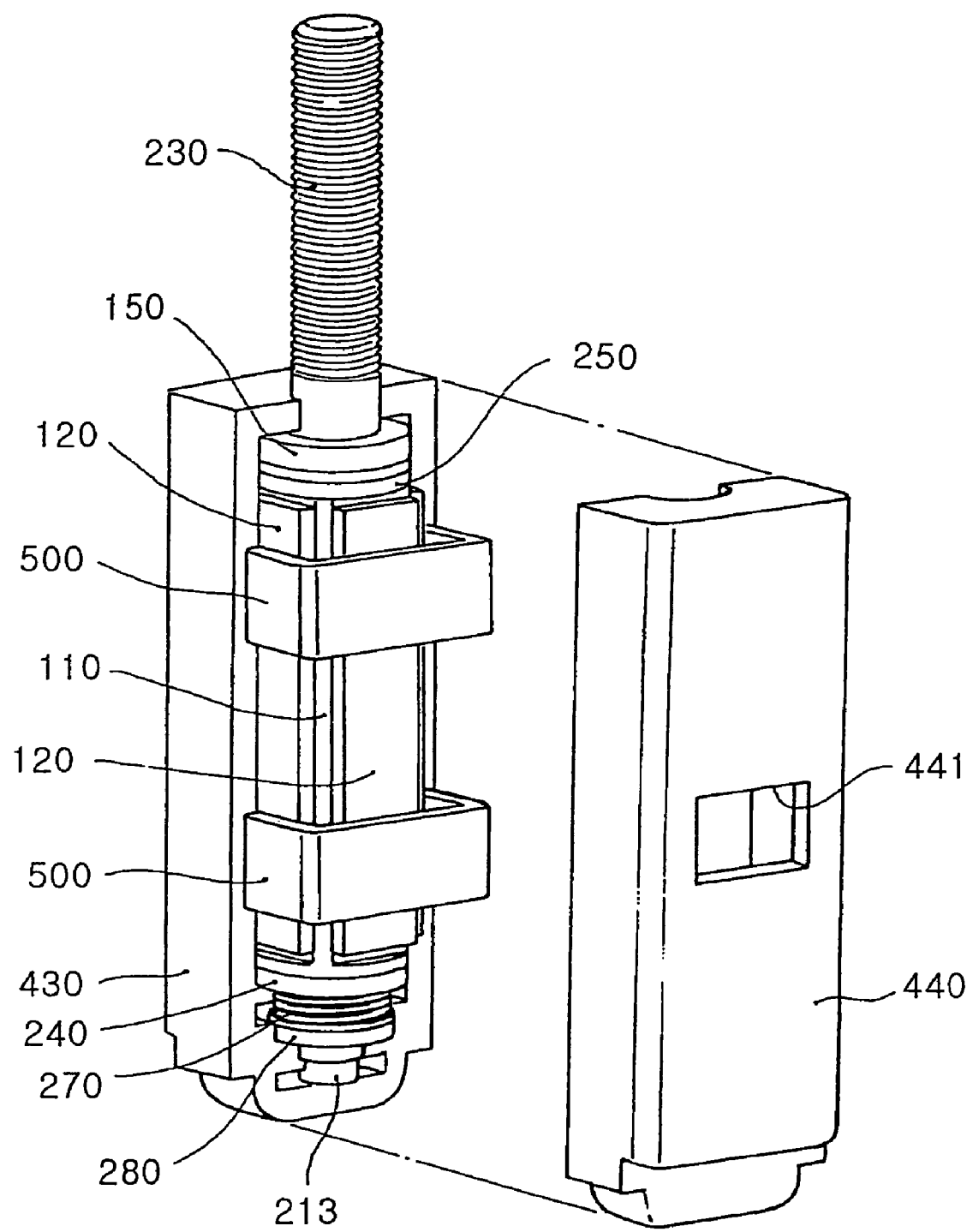
FIG. 8 is another assembly view illustrating the piezoelectric ultrasonic motor according to the second embodiment of the invention.

In addition, FIG. 4 is an exploded perspective view illustrating a piezoelectric ultrasonic motor according to a second embodiment of the invention, FIG. 5 is a perspective view illustrating important parts of the piezoelectric ultrasonic motor according to the second embodiment of the invention, FIG. 6 is a perspective view illustrating the piezoelectric ultrasonic motor according to the second embodiment of the invention, FIG. 7 is an assembly view illustrating the piezoelectric ultrasonic motor according to the second embodiment of the invention, and FIG. 8 is another assembly view illustrating the piezoelectric ultrasonic motor according to the second embodiment of the invention.

The present invention aims to provide a piezoelectric ultrasonic motor for generating rotational force through face contact with an upper or lower surface of a tubular piezoelectric stator.

First, the first embodiment of the invention will be described with reference to FIGS. 2 and 3.

As shown in FIGS. 2 and 3, the first embodiment of the invention relates to a piezoelectric ultrasonic motor 60 including a piezoelectric stator 100 having piezoelectric elements 120, a rotary shaft 200 for rotating in face contact with an upper surface 111 or lower surface 112 of the piezoelectric stator 100 and a power supply 300.

As shown in FIG. 2, the piezoelectric stator 100 includes a hollow metal tube 110 made of metal and a plurality of piezoelectric elements 120 mounted on the exterior of the metal tube 110.

The piezoelectric stator 100 generates strain when an electric field is applied to the piezoelectric elements 120 by the power supply 300.

The metal tube 110 is made of a hollow tube having a circular or polygonal cross section, and has seating portions formed on the exterior thereof to seat the piezoelectric elements 120. That is, where the metal tube 110 has a polygonal cross section, the plate like piezoelectric elements 120 may be mounted on corresponding sides of the metal tube 110. In case of the metal tube 110 having a circular cross section, the metal tube 110 may directly seat thereon piezoelectric elements having an arc-shaped cross section or provided with planar seating portions for mounting the plate like piezoelectric elements 120.

For instance, the metal tube 110 may be constructed of a hollow tube having a quadrangular cross section as shown in FIG. 2, and four piezoelectric elements 120 may be provided one for each side of the metal tube 110.

Figure 10:
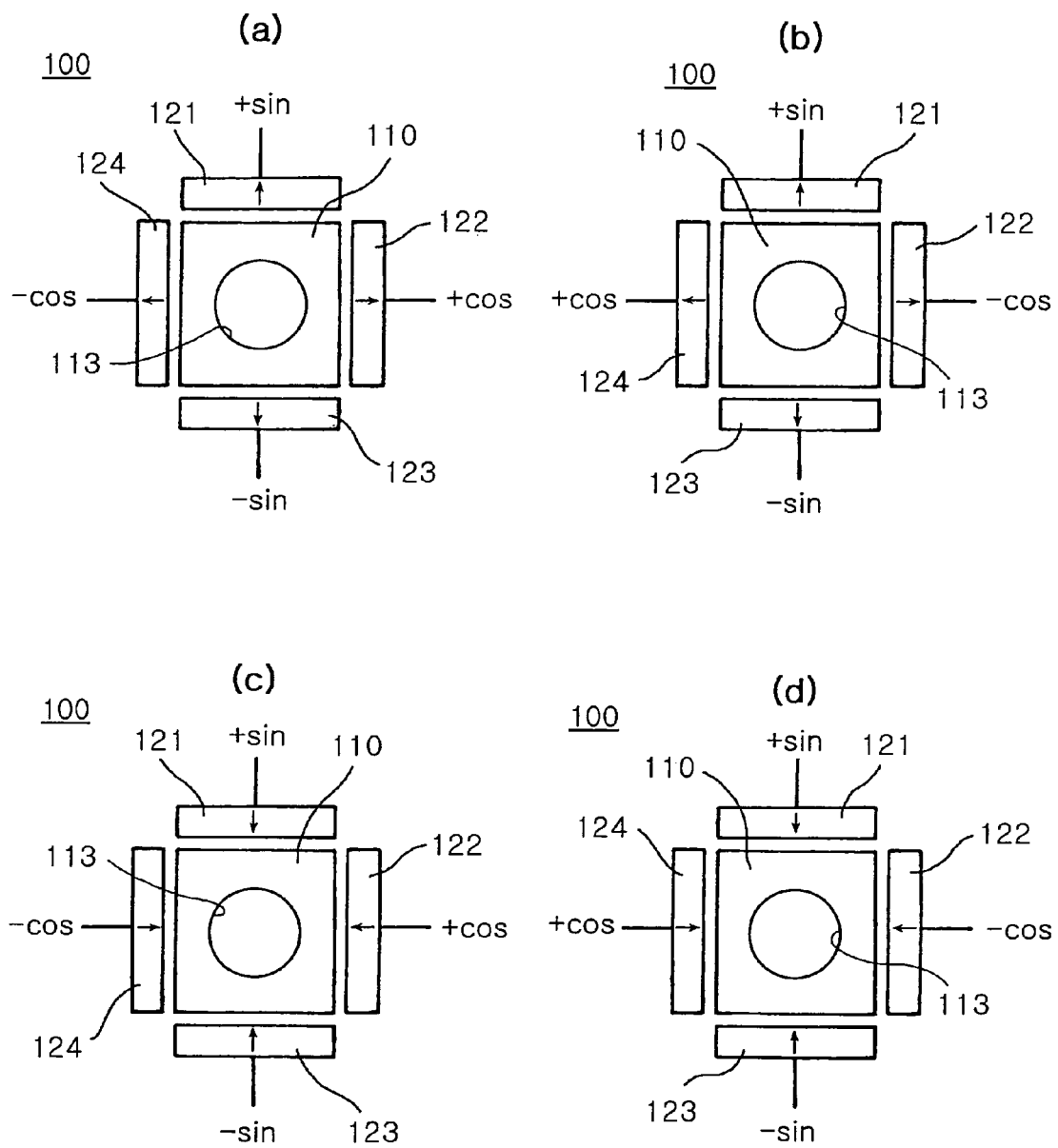
FIGS. 10(a)-10(d) are schematic views illustrating poling directions and driving signals of piezoelectric elements according to four phase energizations of the invention

Here, the piezoelectric elements 120 may have a polarity directed outward from the center of the piezoelectric stator 100 as shown in (a) and (b) of FIG. 10, or directed inward from outside of the piezoelectric stator 100 as shown in (c) and (d) of FIG. 10.

Figure 11:
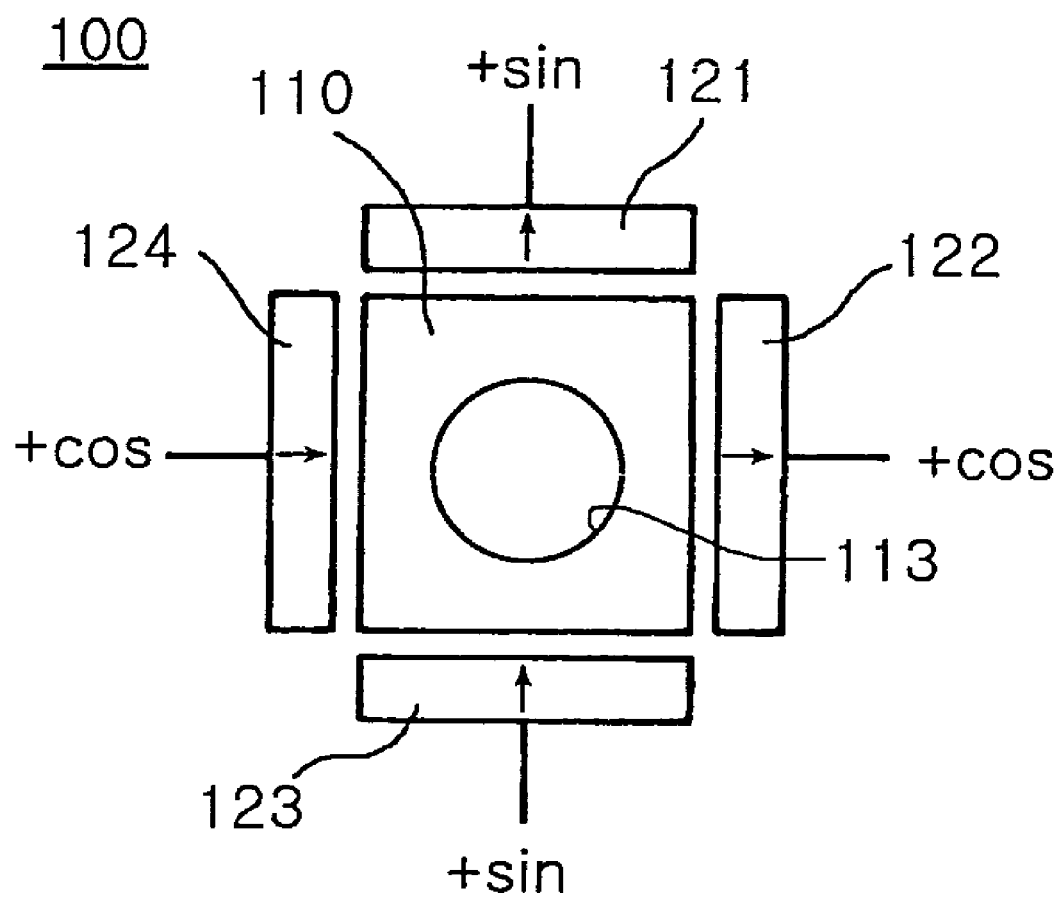
FIG. 11 is a schematic view illustrating poling directions and driving signals of piezoelectric elements according to two phase energization of the invention.

Alternatively, of the piezoelectric elements 120, two adjacent devices 123 and 124 have a polarity directed from outside of the piezoelectric stator 100 toward the center but the other two adjacent devices 121 and 122 have a polarity directed outward from the center of the piezoelectric stator 100 as shown in FIG. 11.

With such a polarization direction, the piezoelectric elements 120 (121 to 124) are strained according to phase difference applied from the power supply 30 as described later, and thus exert forward or backward rotation to the rotor 200.

As shown in FIGS. 2 and 3, the rotary shaft 200 includes a rotation bar 210 inserted into the inner space of the metal tube 110, a rotation member 220 in face contact with the upper surface 111 or the lower surface 112 of the piezoelectric stator 100 and a power transmission member 230 provided at one portion of the rotation bar 210 to transmit the rotational force from the rotation member 220 to an object to be transported.

The rotation member 220 provided around the rotation bar 210 is wheel shaped, and in response to the strain of the piezoelectric stator 100, rotates in face contact with the lower surface 112 of the piezoelectric stator 100. Alternatively, the rotation member 220 may be adapted to rotate in face contact with the upper surface 111 of the piezoelectric stator 100.

The rotary shaft 200 may also include a friction member 250 that is fixed to one surface 221 of the rotation member 220 opposed to the piezoelectric stator 100. The friction member 250 can enhance frictional force thereby increasing the rotational force of the piezoelectric motor 60.

Then, the rotary shaft 200 rotates through the face contact between the lower surface 112 of the piezoelectric stator 100 and the upper surface 251 of the friction member 250.

Alternatively, a friction material of high friction coefficient may be coated on the surface 221 of the rotation member 220, which contacts the piezoelectric stator 100, in order to enhance contact force.

As an example, the friction member 250 or friction material may adopt Poly-Ether-Ether-Ketone (PEEK).

Alternatively, the friction member 250 or friction member may be made of alumina and the contact surface 112 of the piezoelectric stator 100 in contact with the friction member 250 or friction material may be fixedly provided with a contact member (not shown) made of alumina or coated with alumina.

As shown in FIGS. 2 and 2, the piezoelectric ultrasonic motor 60 may have a rotation support member 260 to support the rotation of the rotation bar 210. The rotation support member 260 is fixed at one end to a lower housing 420 and provided at the other end with a recess 261 for rotatably receiving a rotation protrusion 211 of the rotation bar 210.

Furthermore, the piezoelectric ultrasonic motor 60 optionally includes a bushing 150 for receiving and supporting the upper surface 111 of the piezoelectric stator 100. The bush 150 has a hole 151 formed in the center so that the rotation bar 210 can rotate through the hole 151.

Preferably, the rotary shaft 200 has a preload member 270 for pressing the rotation member 220 toward the piezoelectric stator 100 to enhance the contact force.

The preload member 270 may adopt for example a coil spring provided between the rotation support member 260 for supporting the rotation of the rotary shaft 200 and the lower housing 420 as shown in FIGS. 2 and 3.

The power transmission member 230 is but not limited to a lead screw formed above the rotation bar 210. Rather, the power transmission member 230 may adopt any configuration that can transmit the rotational force of the rotary shaft 200.

For example, the power transmission member 230 may be a gear formed at one portion of the rotation bar 210 or a belt or chain provided at one portion of the rotation bar 210.

The power transmission member 230 is adapted to transmit the rotational force from the rotary shaft 200 to an object, thereby linearly moving or rotating it.

As shown in FIGS. 2 and 3, the power supply 300 applies an external supply voltage having phase difference to the piezoelectric elements 120 through terminals 310, by which the piezoelectric stator 100 can be energized.

Each of the terminals 310 is preferably connected to a nodal point of the piezoelectric stator 100 to optimize oscillation efficiency.

FIGS. 4 to 8 show a piezoelectric ultrasonic motor 60 according to a second embodiment of the invention.

As in the first embodiment, the piezoelectric ultrasonic motor 60 of this embodiment includes a piezoelectric stator 100, a rotary shaft 200 and a power supply 300.

This embodiment is similar to the first embodiment, but rotation members 220 and 240 are in face contact with upper and lower surfaces 111 and 112 of the piezoelectric stator 100 in order to enhance contact force and thus rotational force.

In particular, the second embodiment can produce a driving force significantly greater than that of the first embodiment by employing friction at both the upper and lower surfaces.

In order to avoid unnecessary repetition, like parts are designated with like reference signs and their description is omitted.

The piezoelectric stator 100 has a similar construction to the first embodiment, and includes a hollow metal tube 110 having a quadrangular cross section and four (4) piezoelectric elements 120 each installed in one outer surface of the metal tube 110. The piezoelectric stator 100 generates strain whenever an electric field is applied to the piezoelectric stator 120.

The power supply 300 applies an external supply voltage having phase difference to the piezoelectric elements 120 through terminals 310 to thereby energize the piezoelectric stator 100. Each of the terminals 310 is preferably connected to a nodal point of the piezoelectric stator 100 to optimize oscillation efficiency.

The rotary shaft 200 of this embodiment includes a rotation bar 210 inserted into an inner space 113 of the metal tube 110 and a wheel-shaped rotation member 220 provided around the rotation bar 210. The rotation member 220 is in face contact with the upper surface 111 of the piezoelectric stator 100 to rotate in response to the strain of the piezoelectric stator 100. The rotary shaft 200 also includes a lower rotation member 240 mounted on the rotation bar 210 to restrain rotation. The lower rotation member 240 is in face contact at an upper surface 241 with the lower surface 112 of the piezoelectric stator 100. The rotary shaft 200 also includes a power transmission member 230 provided at one portion of the rotation bar 210 to transmit rotation force from the rotation members 220 and 240 to an object to be transported.

Preferably, the rotary shaft 200 optionally includes a friction member 250 fixed to the lower surface of the upper rotation member 220 to enhance rotation force of the piezoelectric ultrasonic motor 60. Here, the rotary shaft 200 rotates through face contact between the upper surface 111 thereof and the lower surface 251 of the friction member 250.

Alternatively, a friction material of high friction coefficient may be coated on the lower surface of the upper rotation member 220, which contacts the piezoelectric stator 100, in order to enhance contact force.

As an example, the friction member 250 or friction material may adopt Poly-Ether-Ether-Ketone (PEEK).

Alternatively, the friction member 250 or friction member may be made of alumina and the contact surface 111 of the piezoelectric stator 100 in contact with the friction member 250 or friction material may be fixedly provided with a contact member (not shown) made of alumina or coated with alumina.

Furthermore, the lower rotation member 240 may be made of PEEK or alumina.

The piezoelectric ultrasonic motor 60 as shown in FIGS. 4 and 6 optionally includes a bushing 150 for assisting the rotary shaft 200 to rotate smoothly when the rotary shaft 200 is assembled with an upper housing 410.

Preferably, the rotary shaft 200 has a preload member 270 for pressing the upper and lower rotation members 220 and 240 toward the piezoelectric stator 100 to enhance the contact force.

The preload member 270 may adopt for example a coil spring mounted around the rotation bar 210 or a step 242 of the lower rotation member 240 as shown in FIG. 4.

Preferably, a separation preventing member 290 is inserted into a groove 212 formed at a lower portion of the rotation bar 210 to prevent the coil spring type preload member 270 from separating from the rotation bar. The separation preventing bar 290 may adopt an E-ring as shown in FIG. 4.

Between the lower rotation member 240 and the separation preventing member 290, a washer 280 is provided to minimize interference.

In the meantime, the lower rotation member 240 is mounted so as to be restrained in rotation with respect to the rotation bar 210 as shown in FIGS. 4 and 5. For this purpose, the rotation bar 210 is provided with a flat cutaway part 211 and the lower rotation member 240 is provided with a planar part 243 corresponding to the cutaway part 211.

That is, the lower rotation member 240 is movable in the longitudinal direction of the rotation bar 210 to enhance the contact force against the piezoelectric stator 100 through the elastic force of the preload member 270, but restrained in the rotation direction to transmit the rotation force obtained through contact with the piezoelectric stator 100 to the rotation bar 210.

The lower rotation member 240 also includes a protrusion 244 rotatably received in an inner space 113 of the metal tube 110 as shown in FIG. 4.

Also, as shown in FIG. 8, a tip 213 of the rotation bar 210 is received rotatably in housings 430 and 440 to enable the rotary shaft 200 to rotate stably.

The power transmission member 230 is but not limited to a lead screw formed above the rotation bar 210. Rather, the power transmission member 230 may adopt any configuration that can transmit the rotational force of the rotary shaft 200.

For example, the power transmission member 230 may be a gear formed at one portion of the rotation bar 210 or a belt or chain provided at one portion of the rotation bar 210. The power transmission member 230 is adapted to transmit the rotational force from the rotary shaft 200 to an object, thereby linearly moving or rotating it.

The piezoelectric ultrasonic motor 60 of this embodiment also includes housings 410 and 420 as shown in FIGS. 2 and 3 or the housings 430 and 440 as shown in FIGS. 7 and 8, which are adapted to receive the piezoelectric stator 100 and the rotary shaft 200.

For example, as shown in FIGS. 2 and 3, the piezoelectric stator 100 and the rotary shaft 200 are received between the upper and lower housings 410 and 420, which are snap-coupled together through coupling members 413 and 421. Here, the upper housing 410 has a hole 411 for applying a supply voltage to the power supply 300 and an opening 412 for exposing the power transmission member 230 to the outside.

Alternatively, as shown in FIGS. 7 and 8, the piezoelectric stator 100 and the rotary shaft 200 are received inside the housings 430 and 440, which are divided into right and left parts. Here, the housing 440 shown in FIGS. 7 and 8 is provided with an opening 441 for applying a supply voltage to the power supply 300.

Such structure of the housings 410, 420 or 430, 440 is merely an example, and various types of housing may be provided to receive the piezoelectric stator 100 and the rotary shaft 200.

With the housings 410, 420; 430, 440, the piezoelectric ultrasonic motor 60 can be assembled into a module and thus applied to various driving or transport apparatuses.

The housings 410 and 420; 430 and 440, when provided as above, give a merit that foreign materials such as dust produced between the piezoelectric stator 100 and the rotation member 220 owing to friction thereof does not soil other apparatuses.

As shown in FIG. 7, the piezoelectric ultrasonic motor 60 of this embodiment also includes a holder 500 for supporting the nodal point of the piezoelectric stator 100 to prevent trembling owing to the oscillation of the piezoelectric stator 100.

The holder 500 may be hollow to surround the piezoelectric stator 100 or opened at a portion thereof.

The holder 500 is be fixed seated in recesses 442 (only one is shown) in FIG. 7. Alternatively, a pair of holders 500 are provided at two nodal points a shown in FIG. 8.

A separation preventing holder 510 is provided to surround the piezoelectric stator 100 and the terminals 310 of the power supply 300 connected to the nodal points of the piezoelectric stator 100 as shown in FIG. 7 in order to prevent the terminals 310 from separating from the piezoelectric stator 100.

The separation preventing holder 510 may be made of an elastic material such as rubber to absorb shaking or trembling due to the oscillation of the piezoelectric stator 100 and the separation preventing holder 510 may be fixed seated in recesses 431.

Now the operation of the power supply 300 according to certain embodiments of the invention will be described with reference to FIGS. 10 and 11.

FIG. 10 shows drive signals for applying supply voltages with a phase difference of 90° in a clockwise or counterclockwise direction according to a four (4) phase energization mode.

Here, (a) and (b) of FIG. 10 indicate the polarization of first to fourth piezoelectric elements 121 to 124 are directed outward from a rotary shaft in the center of a piezoelectric stator 100, (c) and (d) of FIG. 10 indicate the polarization of the first to fourth piezoelectric elements 121 to 124 are directed to the center of the piezoelectric stator 100 from outside.

The power supply 300 applies supply voltages to the piezoelectric elements 121 to 124 with a phase difference of 90° in a clockwise or counterclockwise direction, whereby the piezoelectric stator 100 is strained. This as a result rotates the rotation members 220 and 240 of the rotary shaft 200 in face contact with the upper and lower surfaces of the piezoelectric stator 100.

Figure 1A:
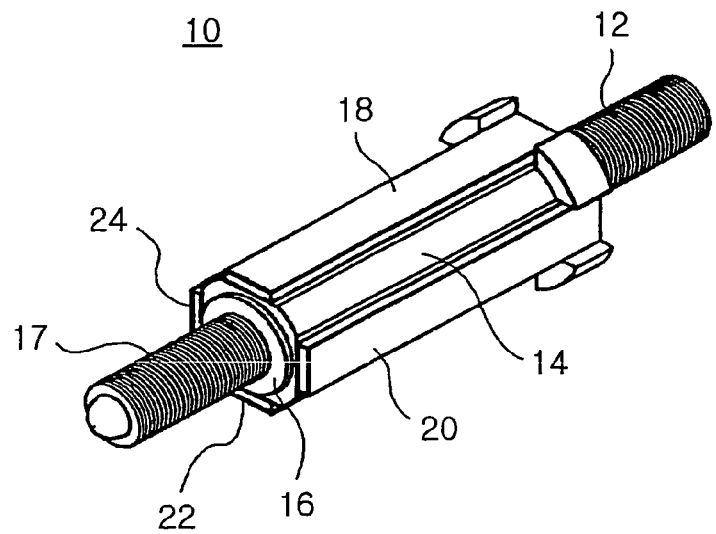
FIG. 1A is a perspective view illustrating a piezoelectric ultrasonic motor of the prior art.
Figure 1B:
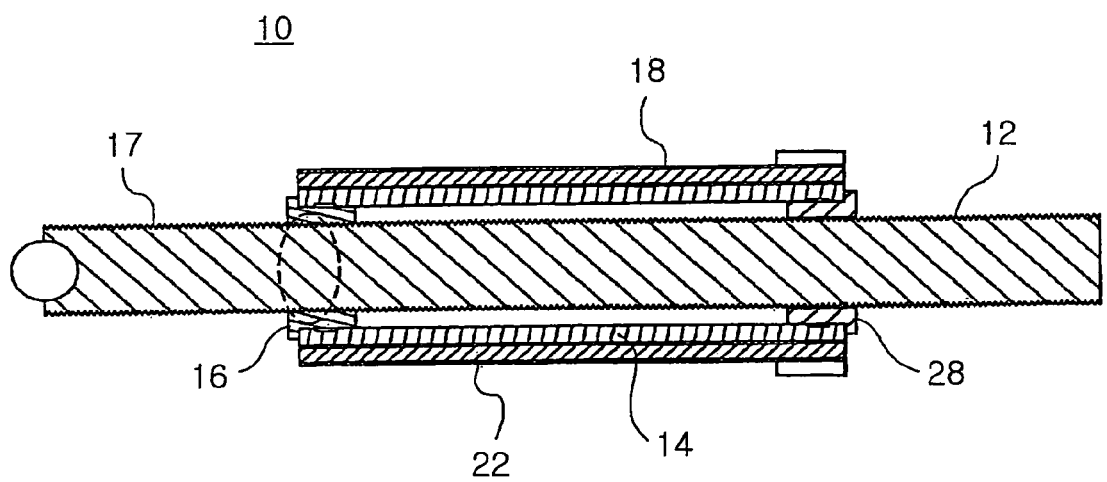
FIG. 1B is a cross sectional view of the piezoelectric ultrasonic motor shown in FIG. 1A.

First, as shown in FIG. 1 (*a*), the power supply 300 has a drive circuit to apply a positive sine wave +sin, a positive cosine wave +cos, a negative sine wave −sin and a negative cosine wave −cos to the first to fourth piezoelectric elements 121 to 124, with a phase difference of 90° in their order of clockwise direction, respectively.

As shown in FIG. 10 (*b*), the drive circuit of the power supply 300 is designed to apply a positive sine wave +sin, a positive cosine wave +cos, a negative sine wave −sin and a negative cosine wave −cos to the first piezoelectric element 121, the fourth piezoelectric element 124, the third piezoelectric element 123 and the second piezoelectric element 122, with a phase difference of 90° in their order of counterclockwise direction, respectively.

The power supply 300 as shown FIGS. 10 (*a*) and (*b*) adopts a single drive circuit to apply supply voltages with a phase difference of 90° to the piezoelectric elements 121 to 124.

With such a drive circuit, the power supply 300 can rotate the rotation members 220 and 240 of the rotary shaft 200 in a clockwise or counterclockwise direction, whereby the piezoelectric motor 60 of certain embodiments of the invention can rotate forward or backward.

FIGS. 10 (*c*) and (*d*) show the same driving mechanism as FIGS. 10 (*a*) and (*b*) except for different polarizing direction of the piezoelectric elements 121 to 124.

That is, as shown in FIG. 10 (*c*), the drive circuit of the power supply 300 may be designed to apply a positive sine wave +sin, a positive cosine wave +cos, a negative sine wave −sin and a negative cosine wave −cos to the first to fourth piezoelectric elements 121 to 124, with a phase difference of 90° in their order of clockwise direction, respectively.

Also, as shown in FIG. 10 (*d*), the drive circuit of the power supply 300 is designed to apply a positive sine wave +sin, a positive cosine wave +cos, a negative sine wave −sin and a negative cosine wave −cos to the first piezoelectric element 121, the fourth piezoelectric element 124, the third piezoelectric element 123 and the second piezoelectric element 122, with a phase difference of 90° in their order of counterclockwise direction, respectively.

As in FIGS. 10 (*a*) and (*b*), the power supply 300 for producing drive signals shown in FIGS. 10 (*c*) and (*d*) adopts a single drive circuit to apply supply voltages to the piezoelectric elements 121 to 124 with a phase difference of 90° in a clockwise or counterclockwise direction. With the drive circuit, the power supply 300 can rotate the rotation members 220 and 240 of the rotary shaft 200 clockwise or counterclockwise, whereby the piezoelectric motor 60 of certain embodiments of the invention can rotate forward or backward.

This disclosure adopting the four phase energization mode has a merit that a ground part is not required in addition.

The piezoelectric motor 60 of this invention can be actuated in a two (2) phase energization mode also.

FIG. 11 illustrates driving signals according to two phase energization of the invention.

As shown in FIG. 11, adjacent two devices 123 and 124 of the first to fourth piezoelectric elements 121 to 124 have a polarization directed from outside the piezoelectric stator 100 to the center, and the other adjacent two devices 121 and 122 have a polarization directed outward from the center of the piezoelectric stator 100.

Where the piezoelectric elements 121 to 124 are polarized as above, the power supply 300 applies supply voltages with the same phase to two opposing piezoelectric elements and supply voltages with a phase difference of 90° or −90° to adjacent piezoelectric elements.

For example, as shown in FIG. 11, the power supply 300 may be provided with a drive circuit for applying a positive sine wave +sin, a positive cosine wave +cos, a negative sine wave −sin and a negative cosine wave −cos to the first to fourth piezoelectric elements 121 to 124, with a phase difference of 90° in their order of clockwise direction, respectively.

Alternatively, the drive circuit of the power supply 300 may be designed to apply a positive sine wave +sin, a negative cosine wave −cos, a negative sine wave −sin and a positive cosine wave +cos to the first to fourth piezoelectric element 121 to 124, with a phase difference of 90° in their order of clockwise direction, respectively.

That is, to produce the drive signals as shown in FIG. 11, the power supply 300 energizes the piezoelectric elements 121 to 124 by applying supply voltages with the same phase to two opposing piezoelectric elements of and supply voltages with a phase difference of 90° or −90° to adjacent piezoelectric elements.

With the drive circuit as above, the power supply 300 can rotate the rotation members 220 and 240 of the rotary shaft 200 clockwise or counterclockwise, whereby the piezoelectric motor 60 of certain embodiments of the invention can rotate forward or backward.

Figure 9:
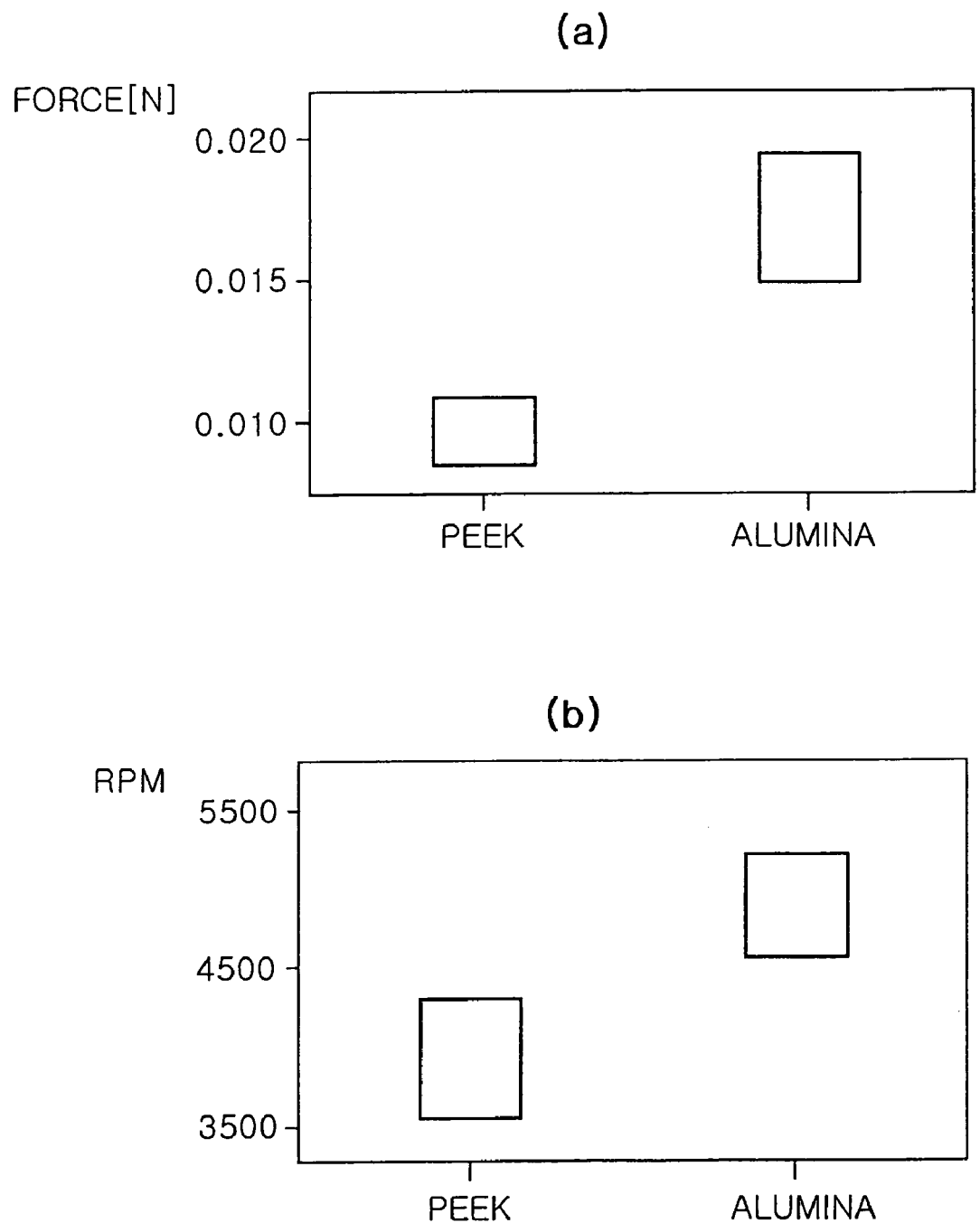
FIGS. 9(a) and 9(b) are graphs illustrating force and RPM distributions according to the material of a contact surface of the invention

FIG. 9 is graphs illustrating force-RPM distribution according to the material of a contact surface of the invention, in which a supply voltage of 16 Vp-p with an input frequency of 140 kHz is applied according to the four phase energization mode as shown in FIG. 10.

Here, blocks "PEEK" indicate force and RPM in a case where PEEK is used in the friction member 250 fixed to the upper rotation member 220, the piezoelectric stator surfaces made of Steel Use Stainless (SUS) are used as the upper and lower surfaces 111 and 112 of the piezoelectric stator 100 without using any friction material, and PEEK is used in the lower rotation member 240.

Blocks "ALUMINA" indicate force and RPM in a case where alumina is used for the friction member 250 fixed to the upper rotation member 220, contact members (not shown) made of alumina are fixed respectively to the upper and lower surfaces 111 and 112 of the piezoelectric stator 100, and alumina is used for the lower rotation member 240.

By using contact at both sides and employing the friction member 250 according to the second embodiment of the invention, it is possible to produce rotation number of 3,500 RPM or more, which is significantly higher than 500 RPM to 600 RPM of the prior art. As a result, a sufficient amount of strain necessary for transport can be produced.

Furthermore, a force of about 0.010 N or more is obtained at a distance of 5 mm, and thus a torque necessary for transport can be produced at a sufficient level.

Therefore, as merits of this invention, strain and torque necessary for the transport of an object can be generated at a sufficient level.

Figure 12:
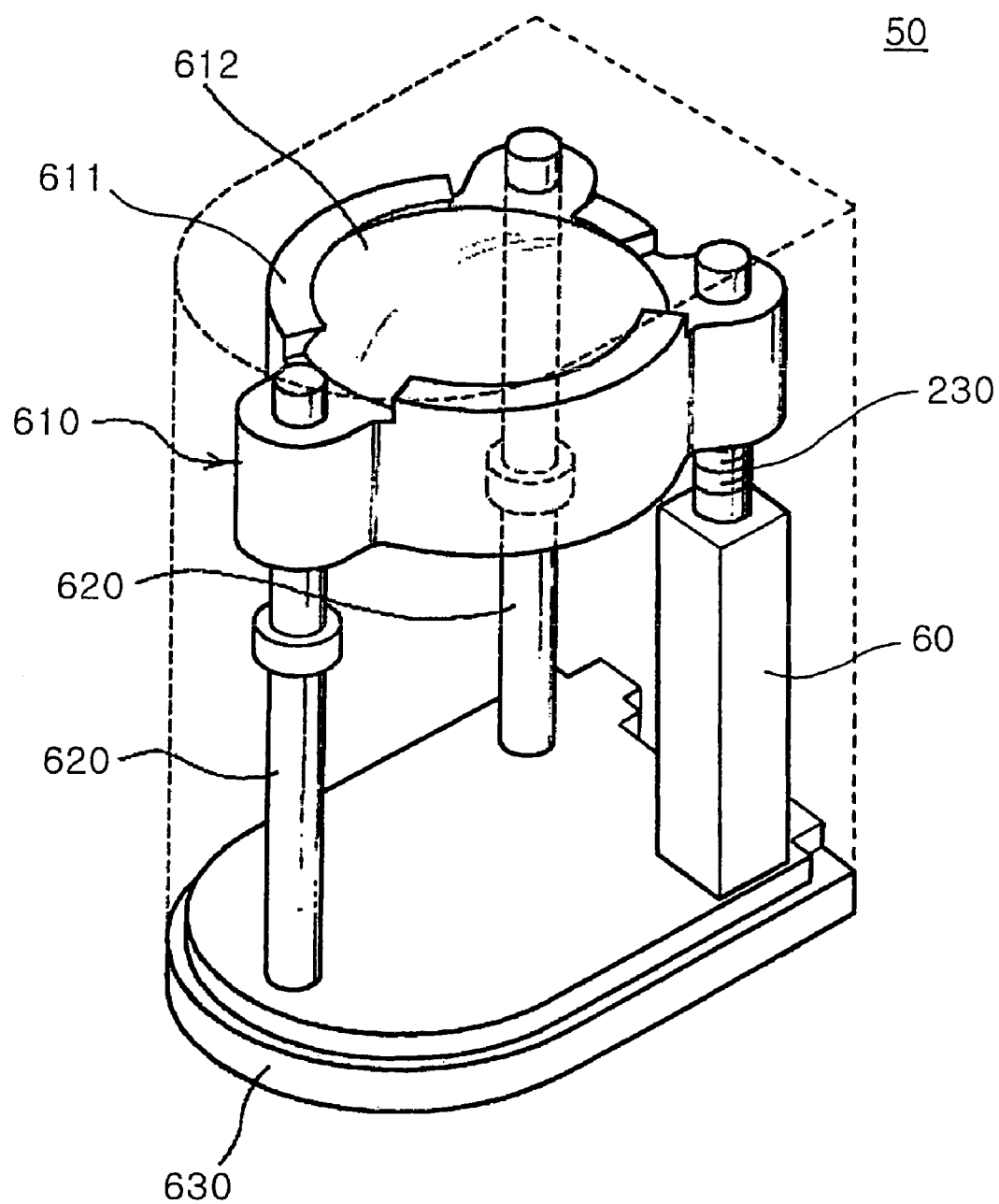
FIG. 12 is a perspective view illustrating a lens driving apparatus.

FIG. 12 is a perspective view illustrating a lens driving apparatus 50 comprising a piezoelectric ultrasonic motor of the invention.

The lens driving apparatus 50 includes a piezoelectric ultrasonic motor 60 having a construction as described above and a lens unit 610 to be transported forward and backward by the power transmission member 230 of the piezoelectric ultrasonic motor 60.

Here, the lens unit 610 includes at least one lens 612 mounted inside a lens barrel 611, which engages with the lead screw of the power transmission member 230 to move linearly and vertically in response to the rotation of the power transmission member 230.

Preferably, the lens driving apparatus 50 includes a guide member 620 for guiding the lens barrel 611 to realize movement along the optical axis.

In the meantime, the piezoelectric ultrasonic motor 60 and the lens unit 610 may be provided inside a housing 630 as a camera module.

The lens driving apparatus 50 including the piezoelectric ultrasonic motor 60 of the invention can generate a great force and a large rotation number, and thus provide a sufficient level of strain and torque necessary for transporting a lens.

As set forth above, the piezoelectric ultrasonic motor of according to certain embodiments of the invention can stably operate to generate enhanced force and sufficient strain and have a flexibility to be applied to various apparatuses such as a camera module.

Furthermore, the piezoelectric stator and the rotary shaft are in face contact with each other to generate a sufficient level of strain and torque necessary for transporting an object. In particular, with the rotary shaft in face contact with both the upper and lower surfaces of the piezoelectric stator, the piezoelectric ultrasonic motor can advantageously achieve a high driving torque and rotation number.

In addition, by using a suitable material such as PEEK and alumina, it is possible to enhance contact force between the piezoelectric stator and the rotation member thereby producing a piezoelectric ultrasonic motor having a sufficient level of driving torque and rotation number.

According to this invention, the piezoelectric ultrasonic motor can be provided in a module, and thus be easily applied to various apparatuses. When the piezoelectric ultrasonic motor is installed inside a housing, it is possible to prevent other parts from being polluted by foreign materials generating from friction and abrasion.

Furthermore, the holder is provided to support the nodal point of the piezoelectric stator thereby to enhance the oscillation efficiency of the piezoelectric stator as well as prevent shaking of the piezoelectric stator.

Moreover, certain embodiments of the invention can adopt various energization modes such as two or four phase energization. In particular, the four phase energization mode can advantageously exclude a structure for grounding.

While the present invention has been shown and described in connection with the preferred embodiments, it will be apparent to those skilled in the art that modifications and variations can be made without departing from the spirit and scope of the invention as defined by the appended claims.

What is claimed is:

1. A piezoelectric ultrasonic motor comprising:
a piezoelectric stator including a hollow metal tube having a quadrangular cross section and four piezoelectric elements each installed in each outer face of the metal tube, the piezoelectric stator straining with an electric field applied thereto;
a rotary shaft including a rotation bar inserted into an inner space of the metal tube, an upper rotation member provided around the rotation bar in contact with an upper surface of the piezoelectric stator, the rotation member rotating in response to the strain of the piezoelectric stator, a lower rotation member adapted to restrain the rotation of the rotation bar and contacting a lower surface of the piezoelectric stator and a power transmission member provided at one portion of the rotation bar to transmit the rotation of the rotation member to an object to be transported; and
a power supply to apply a supply voltage necessary for the actuation of the piezoelectric stator.

2. The piezoelectric ultrasonic motor according to claim 1, wherein the rotary shaft further includes a friction member fixed to a surface of the upper rotation member contacting the piezoelectric stator, and
the rotary shaft rotates through face contact between the piezoelectric stator and the friction member.

3. The piezoelectric ultrasonic motor according to claim 2, wherein the friction member or the lower rotation member is made of Poly-Ether-Ether-Ketone (PEEK).

4. The piezoelectric ultrasonic motor according to claim 2, wherein the friction member or the lower rotation member is made of alumina, and
the contact surface of the piezoelectric stator contacting the friction member is fixedly provided with a contact member made of alumina or an alumina coat.

5. The piezoelectric ultrasonic motor according to claim 1, wherein the rotary shaft further includes a preload member to press the rotation member toward the piezoelectric stator.

6. The piezoelectric ultrasonic motor according to claim 5, wherein the preload member comprises a coil spring mounted on the outer circumference of the rotation bar or a step of the lower rotation member.

7. The piezoelectric ultrasonic motor according to claim 6, further comprising a separation preventing member inserted into a recess formed at the other portion of the rotation bar.

8. The piezoelectric ultrasonic motor according to claim 7, further comprising a washer provided between the lower rotation member and the separation preventing member to minimize interference noise.

9. The piezoelectric ultrasonic motor according to claim 1, further comprising a separation preventing holder to surround the outer circumference of the piezoelectric stator and a terminal of the power supply connected to a nodal point of the piezoelectric stator to prevent the terminals from being separated from the piezoelectric stator.

10. The piezoelectric ultrasonic motor according to claim 1, further comprising a housing to receive the piezoelectric stator and the rotary shaft.

11. The piezoelectric ultrasonic motor according to claim 10, further comprising a holder to support the piezoelectric stator at a nodal point, wherein the holder is seated in an opening of the housing.

* * * * *